United States Patent [19]
Holt

[11] 3,794,154
[45] Feb. 26, 1974

[54] ARTICLE GROUP ASSEMBLY AND FORWARDING CONVEYOR FOR WRAPPING MACHINES

[75] Inventor: Ronald Holt, Battle Creek, Mich.

[73] Assignee: Franklin Electric Subsidiaries, Inc., Bluffton, Ind.

[22] Filed: Dec. 1, 1972

[21] Appl. No.: 311,304

[52] U.S. Cl......................... 198/34, 53/159, 198/76
[51] Int. Cl....................... B65g 35/30, B65g 47/26
[58] Field of Search........ 198/30, 32, 34, 76; 53/159

[56] References Cited
FOREIGN PATENTS OR APPLICATIONS
1,029,379 5/1966 Great Britain........................ 198/30

*Primary Examiner*—Edward A. Sroka

[57] ABSTRACT

Parallel feed conveyors deliver side by side rows of articles to side by side accelerating conveyors. The accelerating conveyors deliver groups of articles transversely across parallel side by side wrapping machine conveyors having package advancing flights in the plane of both conveyors and transversely across the end of the accelerating conveyors. The accelerating conveyors have two different speed drive connections, and adjustable cycle dividing switches driven at the same frequency as the cycle of the advancing flights of the wrapping machine conveyors function to engage the high speed drive to the accelerating conveyors during a fraction only of each package advancing cycle. The dividing switches also function to momentarily close article stop gates between the feed conveyors and the accelerating conveyors at about the beginning of each cycle of the machine.

Adjustable clutch connections permit two speed operation of the in-feeding conveyors and continuous lower speed drive of the accelerating conveyors, for collecting and wrapping half or fractional size groups of articles from the lead articles in the parallel feed conveyors. Longitudinal adjustment of the accelerating conveyors to accommodate the smaller packages is provided.

12 Claims, 8 Drawing Figures

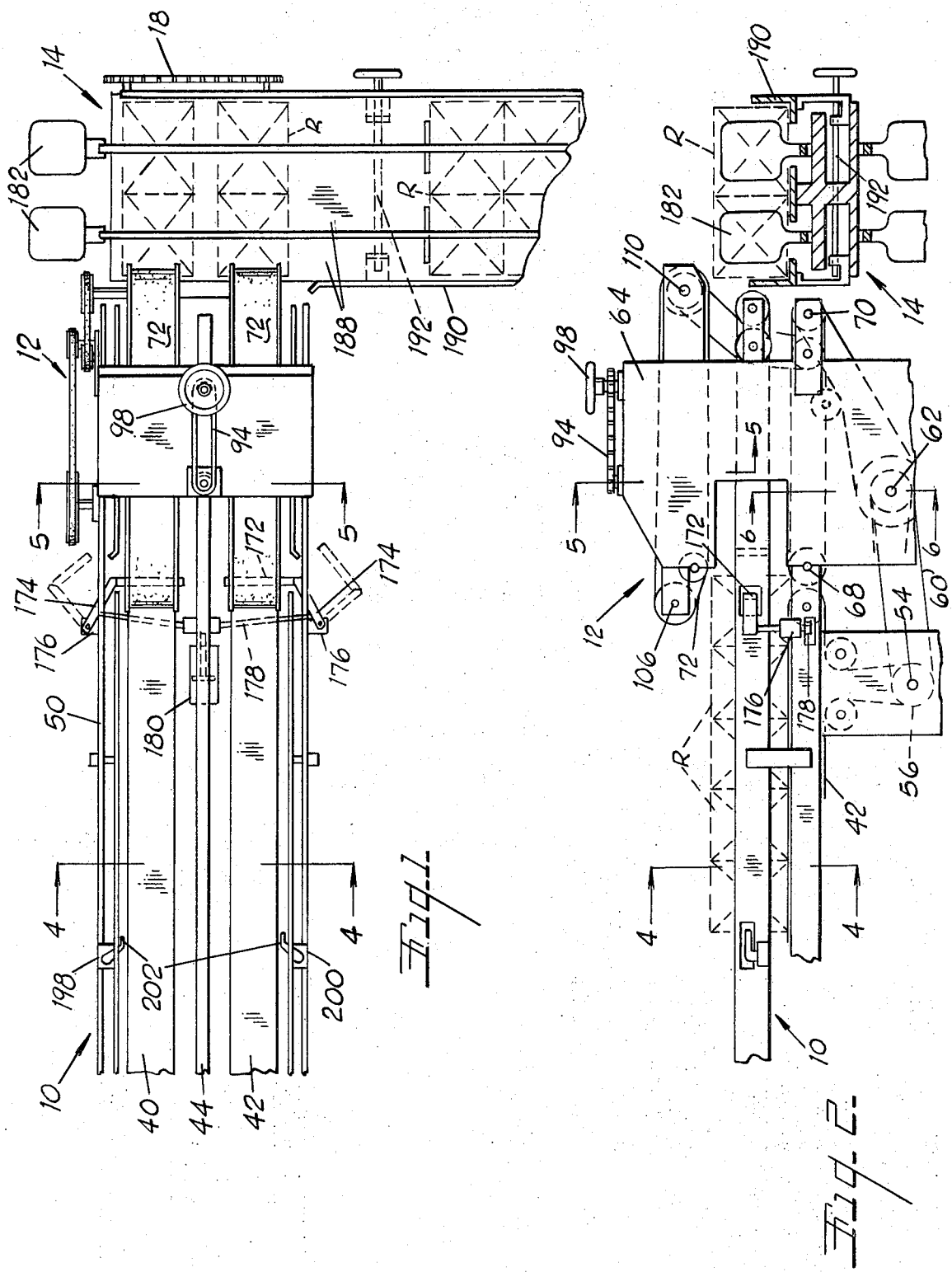

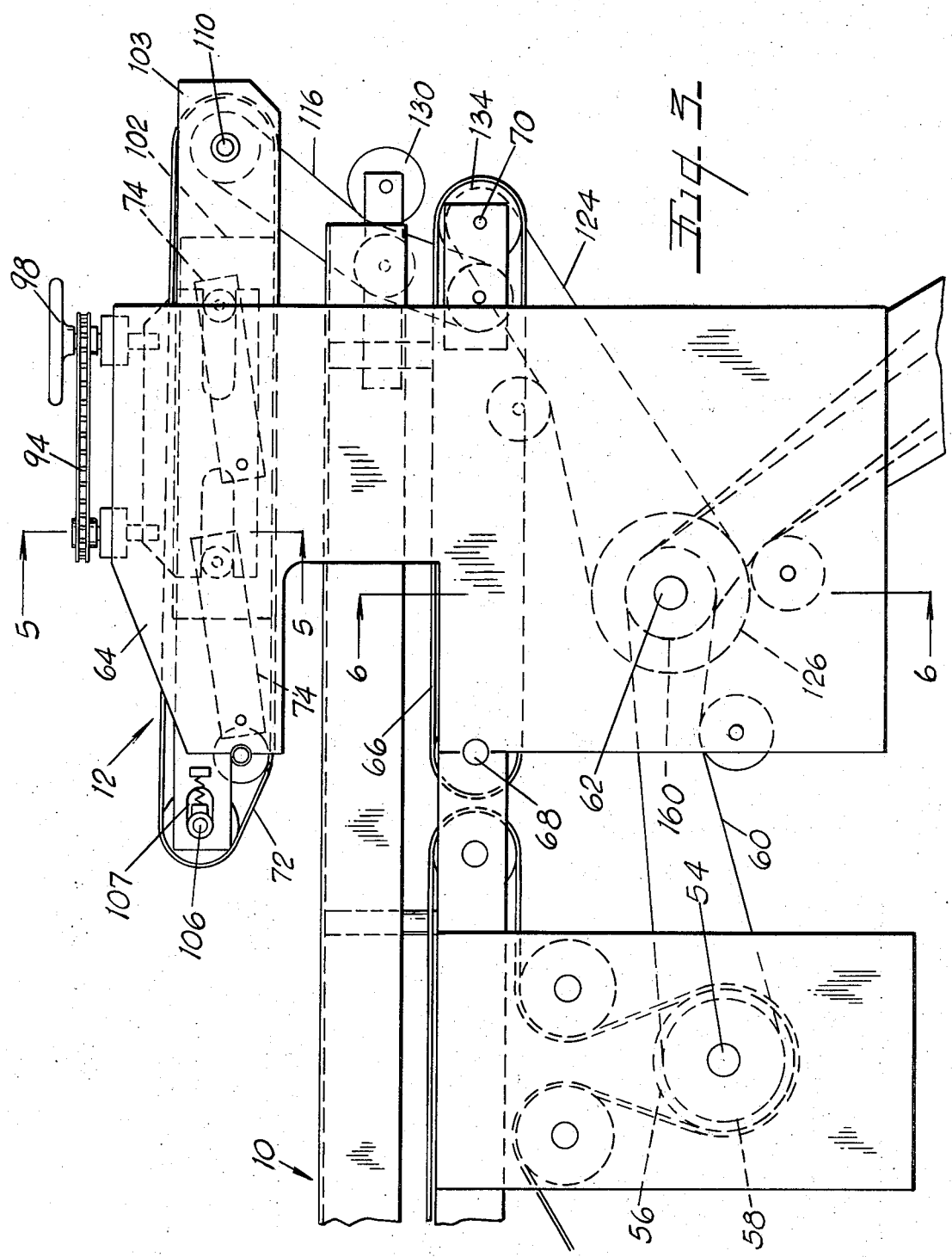

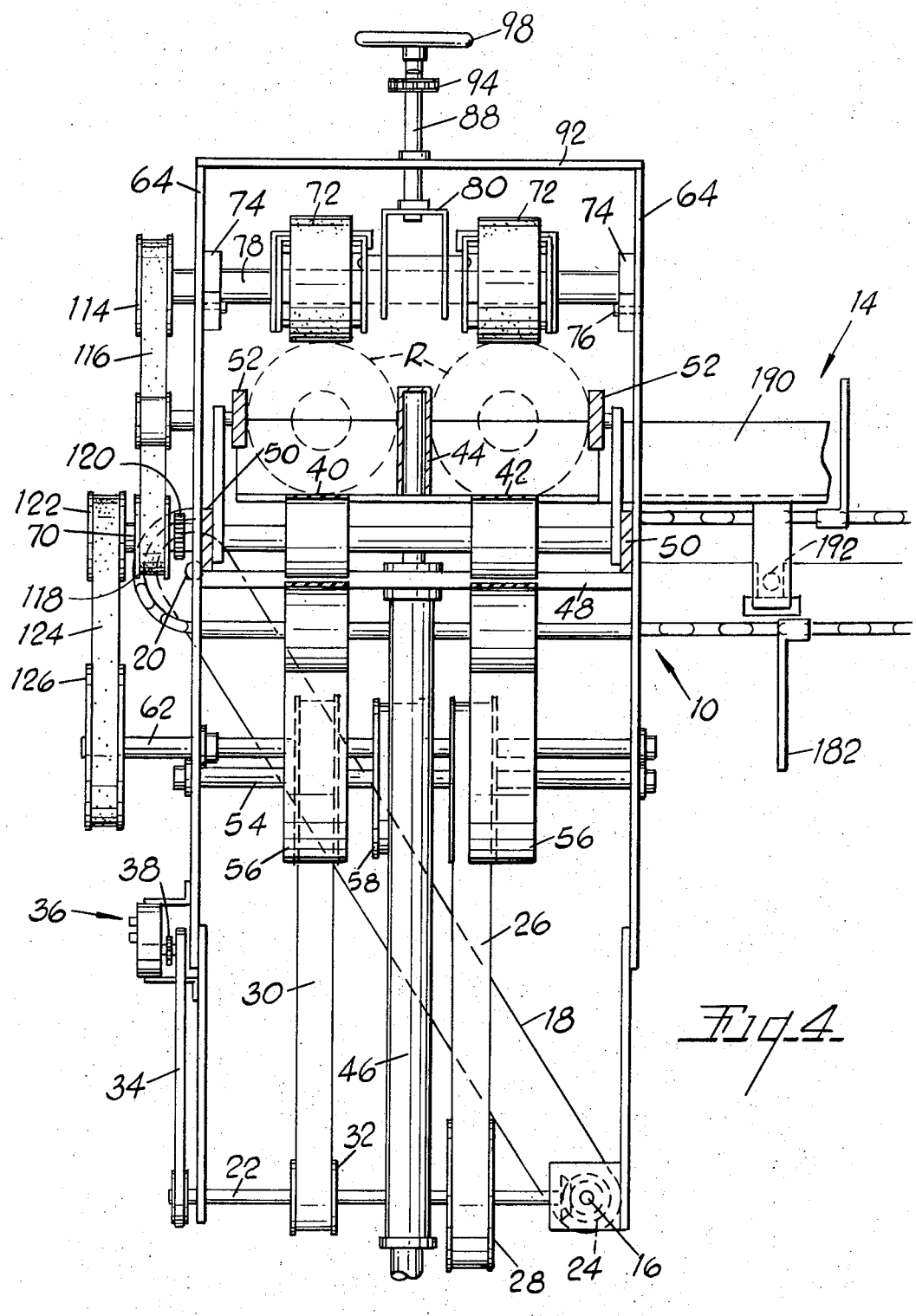

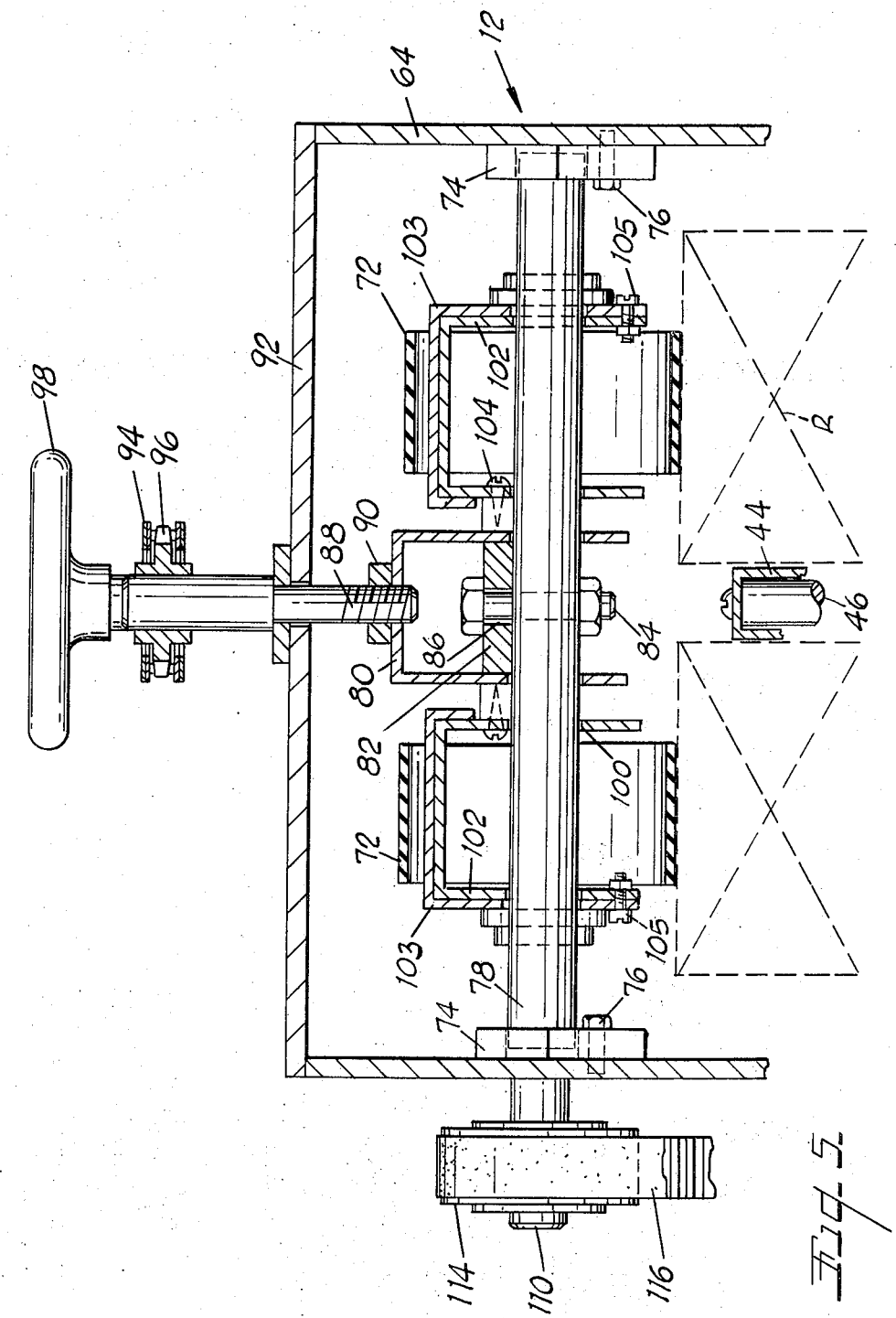

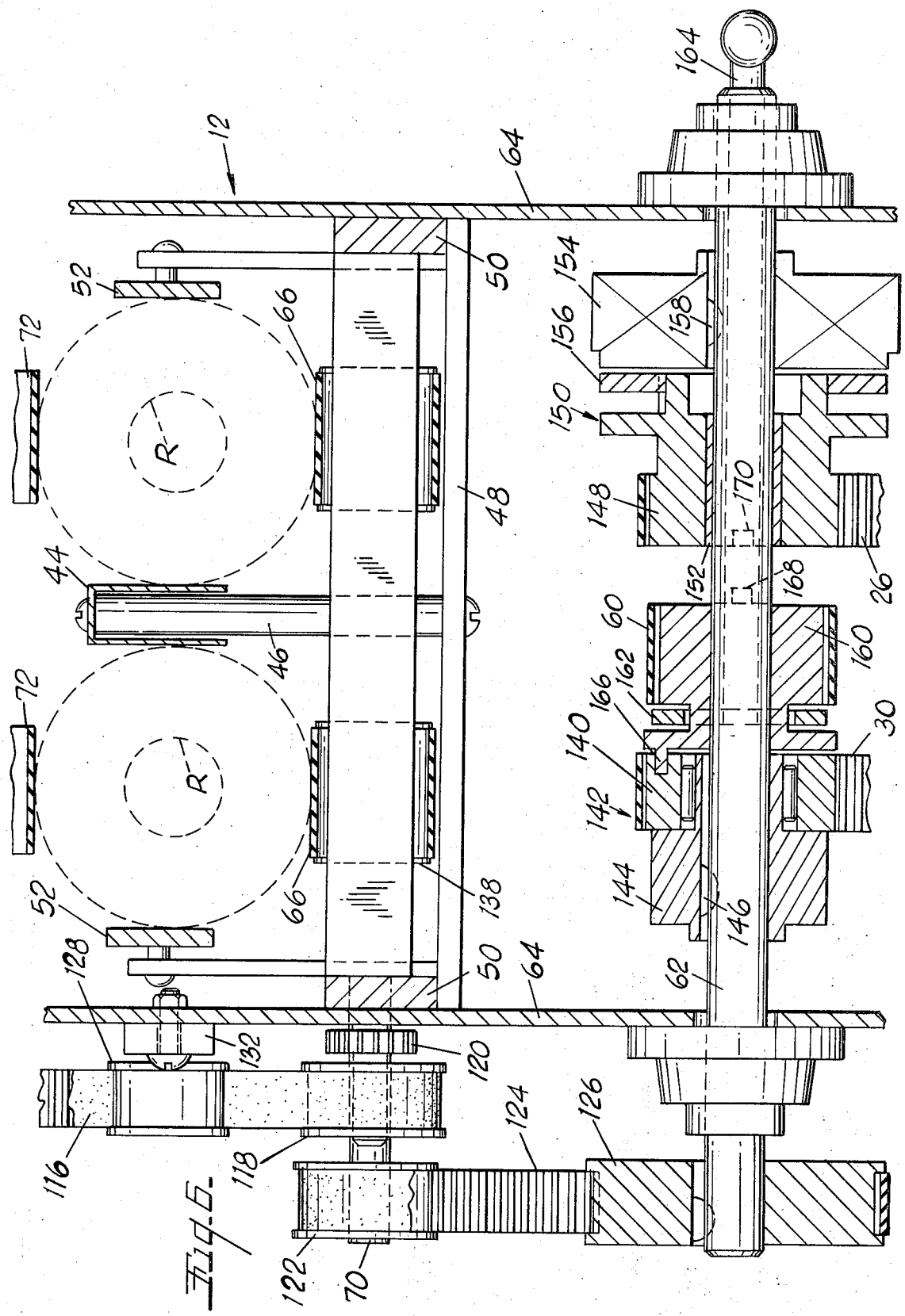

ARTICLE GROUP ASSEMBLY AND FORWARDING CONVEYOR FOR WRAPPING MACHINES

OUTLINE OF INVENTION

This invention relates specifically to machines for wrapping rolls of toilet tissue paper in two and four roll packs, but the selective control and article advancing mechanism can obviously be employed for other articles.

Wrapping machines designed to receive and wrap either two rolls in side-by-side relation, or four rolls in two groups of two with the rolls of one group in end to end relation to the rolls of the other group are old. It is also old and desirable to feed rolls from the manufacturing process in two or more side by side columns or side-by-side rows of rolls, with the rolls in each row arranged in end to end relation. As far as is known, the transfer of the package groups of rolls has always required a vertical or transversely shearing of the group from the leading ends of the feeding rows, for transfer to the plane of the wrapping machine conveyor.

The transverse shearing of package groups has several disadvantages: First, it usually requires two changes in the direction of movement of the rolls. Reciprocating parts are usually required which must return from each advancing motion, and which cause vibration and wear. The duration of the transfer cycle necessarily includes a delay while the reciprocating transfer element retracts to receive the next load from the infeeding conveyor. The frequency of the transfer and therefor the upper limit of the wrapping cycle speed thus has practical limitations due to the transfer. It is a primary advantage of the present invention to reduce the time previously lost in package group formation and transfer to the wrapping conveyor.

The present package group transfer further eliminates the transverse movement of the package group across the ends of the infeeding rows. This eliminates friction between articles and possible damage or abrasion of the articles.

DESCRIPTION

The drawings, of which there are six sheets illustrate a practical and preferred embodiment of the invention.

FIG. 1 is a fragmentary top plan view of the article group formation and transfer mechanism as applied between a more or less common form of article feeding conveyor and an article group wrapping conveyor, and actual wrapping mechanism being omitted.

FIG. 2 is a projected side elevational view of the structure shown in FIG. 1.

FIG. 3 is an enlarged side elevational view of the package group transfer portion of the apparatus.

FIG. 4 is a transverse vertical cross sectional view along the plane of the line 4—4 in FIGS. 1, and 2.

FIG. 5 is a fragmentary, vertical transverse cross sectional view, on an enlarged scale, taken along the plane of the line 5—5 in FIGS. 1, 2 and 3.

FIG. 6 is a fragmentary, vertical transverse cross sectional view, also enlarged, taken along the plane of the line 6—6 in FIGS. 2 and 3.

Figure 7:
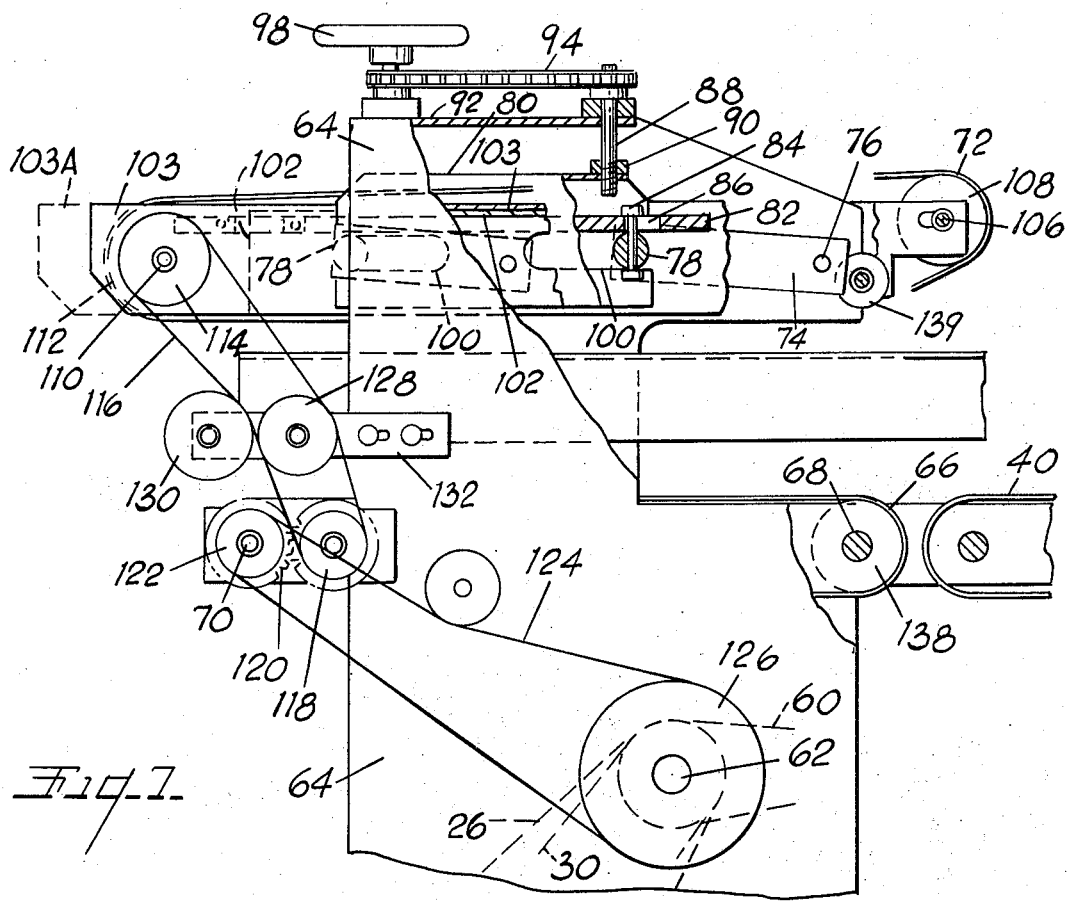
FIG. 7 is a fragmentary elevational view from the rear of FIGS. 2 and 3 and to show drive connections and partially broken away in vertical section to show adjustable parts.

The arrangement of the machine appears most clearly in FIGS. 1 and 2, where an infeed conveyor generally indicated at 10 delivers toward the right to the accelerating conveyor 12. The conveyor 12 in turn delivers across the end of a wrapping machine conveyor 14 which delivers forwardly to a wrapping machine (not illustrated). All of the conveyors have right and left ways which are adapted for handling rolls of toilet tissue indicated by the dotted lines at R. As appears from FIG. 4, all parts are driven in timed relation from a motor (not illustrated) from a main drive shaft 16. A chain or belt 18 drives the shaft 20 of the wrapping conveyor, while a cross shaft 22 extends under the accelerating conveyor from a bevel gear 24. From the cross shaft 22, a high speed belt 26 extends upwardly from a pulley 28, while a slow speed belt 30 extends upwardly from a pulley 32. A third belt 34 extends upwardly to a group of timing switches 36A, B and C which are interconnected by gears 38. The cycle of the machine is thus tied to one revolution of the drive shaft 16.

The infeeding conveyor 10 includes a left belt 40 and right belt 42 which receive the rolls R from a source in two columns with their axes in side-by side relation. The belts are separated by a divider rail 44 supported by posts 46 and suitable cross bars 48. The bars 48 are connected by longitudinal bars 50, which in turn support side rails 52. As appears in FIGS. 2 and 4 a cross shaft 54 carries pulleys 56 which drive the infeed belts. A central pulley 58 drives the shaft by means of a belt 60 from a control shaft 62 which appears in detail in FIG. 6 and which will be described presently.

The accelerating conveyor 12 is supported by two side plates 64 carried by extensions of the side bars 50. Between the plates are located left and right lower belts 66 which are supported as extensions of belts 40–42 on cross shafts 68 and 70. Located between the side plates and in vertically and horizontally adjustably spaced relation over the belts 66 are a pair of pressure belts 72. The belts 72 are vertically and longitudinally adjustably mounted and supported by means of four pivot arms 74 pivoted to the side plates 64 at 76. Swingably supported between the pivot arms are two cross bars 78. The bars pass in supporting relation through holes in the flanges of a downwardly opening center channel member 80. A horizontal plate 82 located between the side flanges is secured to the cross bars 78 by bolts 84 that pass through slots 86 in the plate to the cross bars. (See FIG. 5)

The channel member 80 is further or more directly supported by two elevating screws 88 that engage nuts 90 on the upper cross web of the channel and pass upwardly through bushings in a top plate 92 bridged across the tops of the side plates 64. A chain loop 94 trained around sprockets 96 connects the two screws, and a hand wheel 98 permits vertical adjustment of the center channel 80, plate 82 and cross bars 78, all under the control of the pivot arms 74.

The vertically adjustable cross bars 78 pass slideably through horizontal slots 100 in the ends of the downturned flanges of right and left belt support channels 102. Laterally projecting ears on the plate 282 are also connected to the inner sides of the support channels by screws 104. The belt support channels thus are vertically adjustable with the center channel member 80, and are further longitudinally adjustable by movement of the bolts 84 in the slots 86. This adjusts the position of the support channels and the belts 72 carried thereby to maintain correct position as the cross bars 78 are adjusted on levers 74. Each support channel 102 carries a longitudinally slidably adjustable outer channel 103 for adjusting the belts between the full line position and the dotted line position 103A shown in FIG. 7, for a purpose to be described presently.

The upper pressure belts 72 are carried by a front cross shaft 106 with idler pulleys 108 thereon, and a rear drive shaft 110 with drive pulleys 112 thereon. The shaft 110 is supported in suitable bearings on the depending side flanges of the adjustable channels 103. The rear drive shaft 110 projects to the back side of the accelerating conveyor where it is provided with a pulley 114 driven by the belt 116.

The drive to the belt 116 appears most clearly in FIG. 7 where it is shown that the belt is driven from a fixed pulley 118 on the rear side plate 64. Pulley 118 is connected by gears 120 to another pulley 122. A belt 124 connects pulley 122 to a pulley 126 on the rear end of the control shaft 62. All of the belt drives and pulleys are toothed for accurate timed relation of the drives. Idler pulleys 128 and 130 are adjustable with their mounting bar 132, to adjust the tension of belt 116 when the position of the upper pressure belts is adjusted.

The pulley 122 is keyed to the drive shaft 70 on the rear or off-feeding end of the accelerating conveyor and thus drives pulleys 134 and accelerating belts 66. Belts 66 are trained at their forward ends over idler pulleys 138 on shaft 68 so the belts operate in article receiving relation to the ends of the in-feeding belts 40–42 as previously noted.

Turning to the arrangement of control shaft 62, attention is directed to FIG. 6. The previously described slow speed belt 30 drives the external pulley 140 of an overrunning clutch 142. The hub 144 of the clutch is keyed at 146 to the shaft 62, so that when shaft 62 is not otherwise driven, the belt 30 and pulley 140 drive the shaft. The previously described drive belt 124 drives both the lower accelerator belts 66 and the upper pressure belts 72.

The high speed belt 26, driven by pulley 28 at twice the speed of belt 30, engages pulley 148 of a magnetic clutch 150. Pulley 148 turns freely on a sleeve 152 but is connectable to shaft 62 by energization of the magnetic coil 154 of the clutch to engage clutch plate 156 with the hub of the coil, the hub being keyed to the shaft at 158. Thus, when the coil 154 of magnetic clutch 150 is energized, belt 26 drives shaft 62 and belt 124 at double the speed they are driven by belt 30.

The belt 60 which drives the infeeding belts 40–42 is trained around a shiftable clutch pulley 160 which is free on shaft 62. A shift fork 162 actuated by a push-pull rod 164 moves the pulley 160 on the shaft. FIG. 6 shows the pulley shifted to engage jaw clutch 166 between the pulley and the overrunning pulley 140 of clutch 142. This is the arrangement of the control shaft for feeding one roll from each line or a total of two rolls onto the wrapping conveyor. Pulling out on rod 164 engages jaw 168 on pulley 160 with driving socket 170 on hub 148 of the magnetic clutch when four roll packages are being wrapped.

Positioned longitudinally over the receiving ends of the accelerating belts 66 are a pair of laterally swingable gates 172. The gates are carried by arms 174 attached to upright shafts 176. The shafts are journaled in bearings carried by the side bars 50, and have transversely inwardly extending levers 178 which project to an operating crosshead carried by the piston of a pneumatic cylinder 180 mounted between the off-feed ends of the in-feeding belts 40 and 42. The cylinder is actuated as will be described to swing the gates inwardly to obstruct entry of articles to between the upper presser belts and the lower accelerating belts for a very short time interval after each package group of rolls enters between the belts.

CONTROLS AND ADJUSTMENTS

Figure 8:
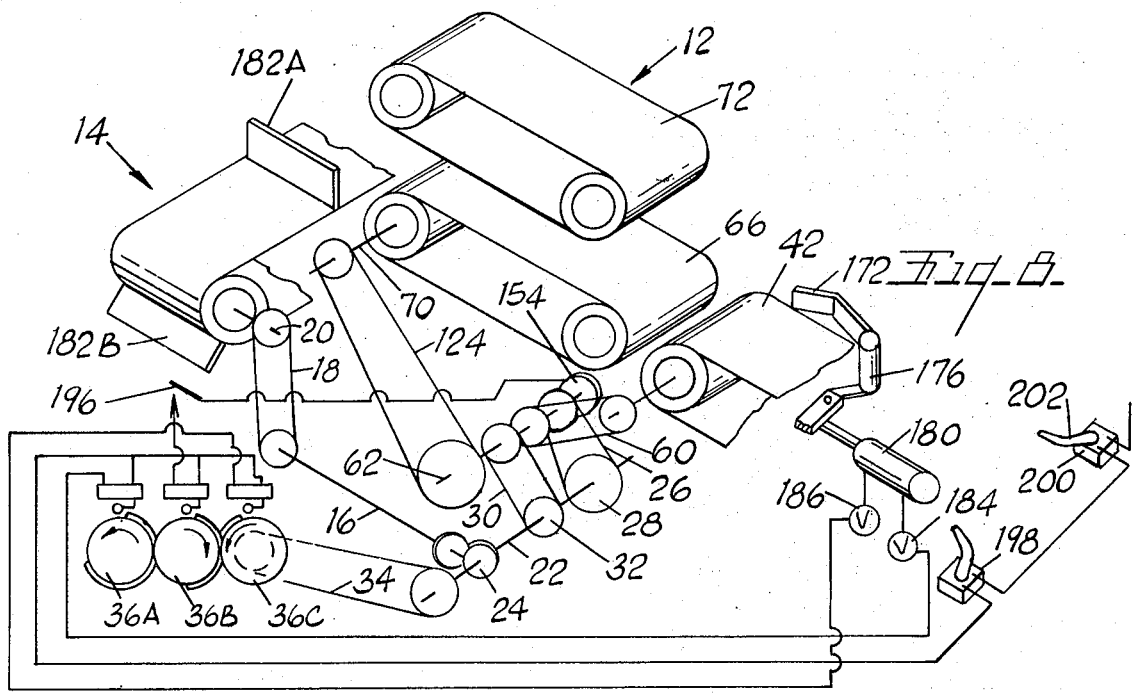
FIG. 8 is a schematic diagram showing electrical and mechanical controls of the system.

FIG. 8 illustrates conventionally the controls of the machine. The machine cycle is tied to the rate and frequency of advance of the pusher flights 182 of the wrapping machine conveyor past the off-feeding end of the accelerating conveyor. Considering the start of a cycle to be the point at which flight 182A picks up a package group of rolls for advance to the wrapping machine, and pusher flight 182B approaches for a second group, gates 172 will have just opened to release the second group. This action is accomplished by closing of switch 36A which energizes valve 184 to advance the piston of cylinder 180. After the desired package group has entered between the belts 66 and 72 and been moved ahead, past the gates, switch 36C will close to energize valve 186 and retract the piston of the cylinder, closing the gates. The timing of the switches and their open and closed periods are adjustable. Obviously a single on-off switch and a single spring returned valve or spring biased cylinder or actuator for the gates could be substituted, but a somewhat more precise timing adjustment of the conveyor 14 to the wrapping machine is effected. The slideway 188 of that conveyor will accommodate a package two rolls wide when side rails 190 are spaced apart. When the side rails are drawn closer together, as by adjustment of an old expedient of a cross screw 192 (See FIG. 2), only one roll will be received from each row of the feeding conveyor and a two roll package will be formed. A selector switch 196 in the control circuit of FIG. 8 must also be adjusted. When opened, the switch interrupts and prevents the energization of the magnetic clutch 154 and the resulting high speed drive to the accelerating conveyor 12. This condition is effected when two roll packages are being formed.

A pair of supply sensing switches 198 and 200 are located along the in-feeding conveyors 40 and 42 and have fingers 202 projecting across the belts to close the switches when there is an adequate supply of rolls to be wrapped. When no rolls are present, the current to the control switches is interrupted.

PROPORTIONS, RATIOS AND TIMING

In the example illustrated, the rolls R being packaged are approximately 5 inches in diameter and 5 inches long. This means that for a four roll package, two rolls from each column must be fed 10 inches across the full width of the way 188 of the wrapping conveyor 14 between or ahead of each set of advancing pusher flights 182. For a two roll package, the lead rolls from each column must be advanced across the middle of the wrapper way or 2 inches less; but since there will be no second roll pushing the lead rolls, the distance fed by the accelerating conveyor is increased. The effective length of feed for four rolls is about 20 ½ inches, while the two roll feed is about 23 inches. The increase is achieved by extending the rive rolls 112 rearwardly as described previously. The drive ratio to the timing switches provides one complete cycle of each switch for each advance of a pusher flight 182.

The drive ratio to infeed belts 40 and 42 provides a feed rate of about 5 inches per cycle when driven by slow speed belt 30 and clutch 166. When clutch 168–170 is engaged to drive from high speed belt 26, the infeed speed is about 10 inches per cycle. Accelerating belts 66 and 72 always operate together at equal speeds. When the drive is through the slow speed belt 30 and overrunning clutch 142, this speed is about 10 inches per cycle. It doubles when shifted to high speed belt 26 by magnetic clutch 150.

FOUR ROLL PACKAGE CYCLE

Switch 196 is closed, activating magnetic clutch 154 under the control of timing switch 36B. Control rod 164 is pulled out engaging clutch elements 168–170. In-feeding belts 40–42 are accordingly driven by high speed belt 26. Switch 36A and valve 184 initiate the start of a cycle by actuating cylinder 180 to open gates 172. This permits rolls to advance to between the accelerating belts 66 and 72 at the higher in-feed speed of about 10 inches per cycle. The accelerator belts pick up the rolls at about same speed and advance the leading four rolls together until one roll and about three quarters of a following roll are effectively engaged between the accelerator belts, or for about eight inches of travel. Switch 36B then closes to initiate high speed operation of belts 66 and 72 so the four rolls accelerate to about twenty inches per cycle for part of the cycle. This carries the two lead rolls about twelve or thirteen inches completely through the accelerator belts and part way across the wrapper way 188, followed by the second pair of rolls of the package group. The acceleration also creates a gap ahead of the following rolls of the second package group. Switch 36C is adjusted to close the gates as soon as the package group has cleared the gate opening, and while the package group is still advancing at high speed.

Just prior to complete delivery of the package group onto the wrapper way 188, switch 36B opens, restoring slow speed operation of the belts 66 and 72. The final portion of the cycle then consists of the first group of rolls completing their advance by belts 66 and 72 pushing on the second rolls of the package group at the slower speed of about ten inches per cycle, while the following third and fourth rolls to form the next group are held momentarily behind the closed gates. Considering the time between successive openings of the gates to be one cycle, the gates are opened from zero to about 75 percent of the cycle, while the the high speed operation of the accelerator belts is in effect from about the middle to 95 percent of the cycle.

TWO ROLL PACKAGE OPERATION

As previously indicated control rod 164 is adjusted to engage clutch teeth 166 with pulley 140, and switch 196 is opened to permanently deactivate magnetic clutch 150. This drives belts 40 and 42 at about 5 inches per cycle, and also drives accelerator belts 66 and 72 from slow speed belt 30 and overrunning clutch 142 at a constant speed of slightly more than ten inches per cycle. Switch 36B is ineffective. As previously described, the presser belt support channels 103 are adjusted rearwardly so that the presser belts project rearwardly to position 103A, over the center of the narrowed way 188.

Switch 36A is closed to open gates 172 to start the cycle and the two lead rolls are immediately accelerated by belts 66 and 72 to ten inches per cycle, creating a gap behind them. They are advanced at this same speed the full extended length of the accelerating conveyor or about twenty-three inches to the enter of the wrapper way. Switch 36C is adjusted to close gates 172 as soon as the acceleration of the lead rolls creates a gap at the outlet ends of belts 40 and 42.

In either adjusted condition of the machine, package groups of rolls are separated and advance in a straight line without transverse shearing between the rolls. Each group is deposited onto the wrapping machine conveyor as fast as that conveyor can accept them, and the over-all wrapping operation is speeded up and carried out smoothly. While the example illustrated is for handling toilet paper rolls, other articles can be handled. Variations in the details of size and speeds of the parts can be made within the contemplation and scope of the appended claims.

What is claimed as new is:

1. Article feeding apparatus in combination with the feed conveyor of a wrapping machine having spaced successively advanced package advancing flights, comprising
   A. an article accelerating conveyor having its delivery end arranged adjacent the side of said feed conveyor and in transversely extending relation thereto,
   B. a supply conveyor having its delivery end arranged in generally aligned article transferring relation to the receiving end of said accelerating conveyor,
   C. said accelerating conveyor and said supply conveyor each being arranged to advance articles in two parallel columns and each having belts movable in slidable relation to articles thereon when motion of the articles therewith is obstructed,
   D. common drive means connected to simultaneously drive all said conveyors and divided into:
      a. a first branch drive connected to advance successive flights of said feed conveyor at a constant speed,
      b. a second branch drive connectable to drive said supply conveyor at a first lineal rate,
      c. a third branch drive connectable to drive said supply conveyor at a second lineal rate approximately double said first lineal rate,
      d. a fourth branch drive connectable to drive said accelerating conveyor at a third lineal rate approximately equal to said second rate,
      e. a fifth branch drive connectable to drive said accelerating conveyor at a fourth lineal speed approximately twice said third lineal rate,
   E. gate means swingable across the path of articles entering onto said accelerating conveyor and including actuating means to advance and retract the gate means,
   F. first adjustable switch means driven from said common drive means at a repeating cycle equal to the frequency of advance of the flights on said feed conveyor,
   G. said first switch means being connected to the actuating means of said gate means to advance and retract said gate means during each cycle of advance of said flights, H. and second adjustable switch means driven from said common drive means at the same repeating cycle as said first switch means, I. said second switch means being connectable to engage said fifth branch drive to the exclusion of said fourth branch drive during a fraction only of the cycle of said second switch means.

2. Article feeding apparatus as defined in claim 1 in which said article accelerating conveyor includes vertically spaced parallel upper and lower belts adapted to receive articles therebetween and each driven at the same speeds.

3. Article feeding apparatus as defined in claim 2 in which the uppermost of said belts is adjustable longitudinally to project its rear end partially over the way of said in-feeding conveyor.

4. Article feeding apparatus as defined in claim 3 in which there is:

a manually operable clutch to selectively engage said second branch drive or said third branch drive, and a manually operable switch arranged in series with said second switch means to selectively interrupt said second switch means and prevent engagement with said fifth branch drive throughout the cycle of said switch means.

5. Article feeding apparatus as defined in claim 1 in which:

said fourth branch drive includes an overrunning clutch, and said fifth branch drive includes a magnetic clutch, the disengageable output side of which drives through the overrun part of said fourth branch drive.

6. Article feeding apparatus as defined in claim 5 in which said second branch drive and said third branch drive include a manually operable clutch arranged to selectively engage the driven part of said overrunning clutch and the driven part of said magnetic clutch.

7. In combination with an in-feeding conveyor to a wrapping machine, said conveyor having a double width way and successively advanced article advancing flights, and a double way article supply conveyor arranged to deliver transversely toward said in-feeding conveyor, article group forming apparatus comprising:

A. a double way accelerating conveyor arranged in end to end receiving relation from said supply conveyor and with its outlet end arranged in generally co-planar abutted cross feeding relation to the way of said in-feeding conveyor, B. a first drive shaft driven in timed relation to the cycle of advance of the flights of said infeeding conveyor, C. a control shaft connected to drive said accelerating conveyor and having a pair of driven pulleys thereon, a. a first of said driven pulleys being drivingly connectable to said control shaft by an overrunning clutch and adapted to be overrun by the control shaft, b. the second of said driven pulleys being connectable to said control shaft by an electrically actuated clutch, c. a third pulley freely rotatable on said control shaft adapted to be selectively and mechanically connected alternatively to either of said first and second driven pulleys, D. a first belt connecting said third pulley to said pulley conveyor, E. a low speed drive connection between said first drive shaft and said first driven pulley, F. a high speed drive connection between said first drive shaft and said second driven pulley, G. first electrical switch means cyclically driven in timed relation to said article advancing flights and adjustable within the cycle of the flights, a. said first switch means being electrically connected to actuate said electrically actuated clutch, H. and selectively operable second switch means connected in series with said first switch means to prevent operation of said electrically actuated clutch.

8. The combination as defined in claim 7 in which said accelerating conveyor includes vertically spaced upper and lower belts adapted to grip and advance articles therebetween.

9. The combination as defined in claim 7 in which there are further:

I. gate means movable between open and closed article stopping position between the adjacent ends of said supply conveyor and said accelerating conveyor, J. and operating means cyclically and adjustably driven in timed relation to said article advancing flights and connected to open and close said gates once during each cycle of advance of said flights.

10. The combination as defined in claim 9 in which said operating means for opening and closing said gates include second electrical switch means cyclically driven in timed relation to said flights and adjustable in the cycle thereof.

11. The combination as defined in claim 10 in which said accelerating conveyor includes vertically spaced upper and lower belts adapted to receive and advance articles therebetween, K. and means to longitudinally adjust the rear end of the upper of said belts between a forward position in clearing relation alongside of said in-feeding way and a rearwardly extending position partially overlying said in-feeding way.

12. The combination as defined in claim 9 in which the high speed drive of clause F is about twice the speed of the low speed drive of clause E.

* * * * *